Oct. 29, 1968  F. KAISER ET AL  3,408,037
ROTARY VALVE WITH FLUID PRESSURE SEALING CLOSURE MEMBER
Filed Oct. 27, 1965  2 Sheets-Sheet 1

INVENTORS
Friedrich Kaiser
Helmut Pirchl
Albert Surber
BY Dodge and Sons
ATTORNEYS Oct. 29, 1968     F. KAISER ET AL     3,408,037
ROTARY VALVE WITH FLUID PRESSURE SEALING CLOSURE MEMBER
Filed Oct. 27, 1965     2 Sheets-Sheet 2

INVENTORS
Friedrich Kaiser
Helmut Pirchl
Albert Surber
BY Dodge and Sons
ATTORNEYS United States Patent Office 3,408,037
Patented Oct. 29, 1968

3,408,037
ROTARY VALVE WITH FLUID PRESSURE
SEALING CLOSURE MEMBER
Friedrich Kaiser, Mannedorf, Helmut Pirchl, Wallisellen, and Albert Surber, Zurich, Switzerland, assignors to Escher Wyss Aktiengesellschaft, Zurich, Switzerland, a Swiss corporation
Filed Oct. 27, 1965, Ser. No. 505,384
Claims priority, application Switzerland, Nov. 13, 1964, 14,703; June 11, 1965, 8,164
9 Claims. (Cl. 251—175)

ABSTRACT OF THE DISCLOSURE

A rotary valve including a housing having aligned inlet and outlet openings having a rotary valve element therein provided with a through passage movable between first and second positions in which, respectively, the passage registers with said openings or is disconnected therefrom, and an elastically deformable annular closure plate mounted on the valve element and arranged with its outer periphery encircling one of said openings in the second position of the valve element. An annular chamber is provided between a portion of the valve element and the side of the closure plate remote from the encircled opening, said chamber being selectively pressurized or relieved of pressure whereby the outer periphery of the plate seals against or is spaced from a seat formed around the opening encircled by the plate.

---

Figure 1:
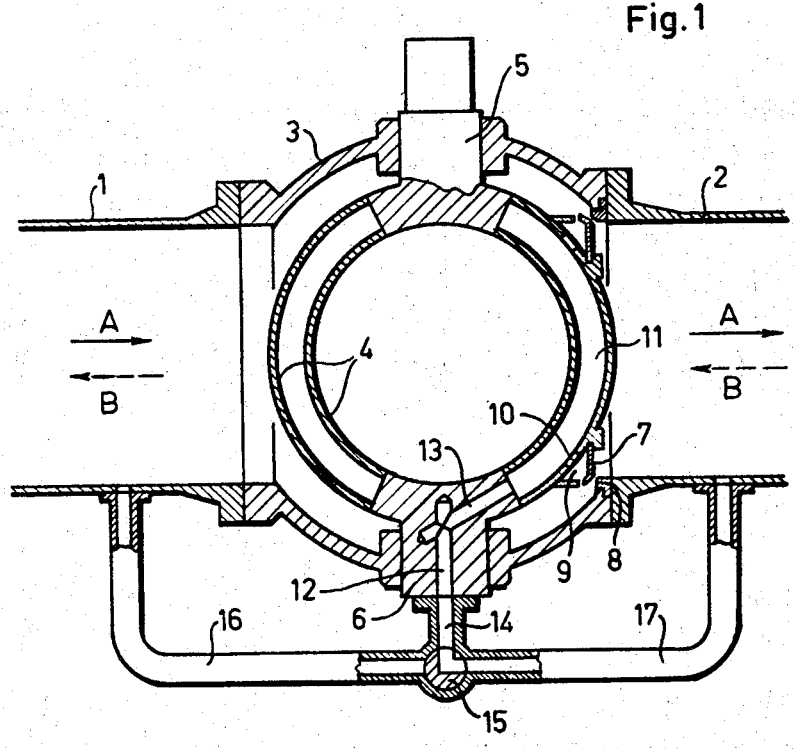

This invention relates to a rotary valve for a pipeline comprising an annular closure member which is arranged at the valve rotor and in the closed position of the rotor co-operates with an annular sealing seat arranged in the valve housing, and at the side remote from the said sealing seat bounds, together with the rotor an annular chamber which can be subjected to and relieved from fluid pressure, selectively.

A rotary valve of this kind is known wherein the annular closure member is arranged to be axially displaceable in an annular groove of the rotor. Since the annular chamber has to be kept sealing-tight relatively to the outlet side of the rotor, sealing elements have to be arranged in the annular groove in this case which permit axial displacement of the annular closure member. However, these sealing elements are subjected to wear owing to the movement of the closure member.

In order to obviate this disadvantage, according to the invention in the rotary valve of the type initially described, the closure member is constructed as an elastically yieldable annular plate and is connected at its inner edge to the valve rotor, whereas at a region situated further outward it is provided with an annular sealing surface which is intended to come to bear on the sealing seat of the housing.

Figure 2:
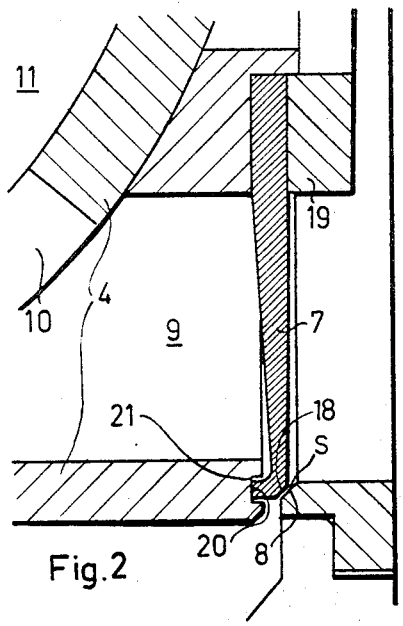
Figure 3:
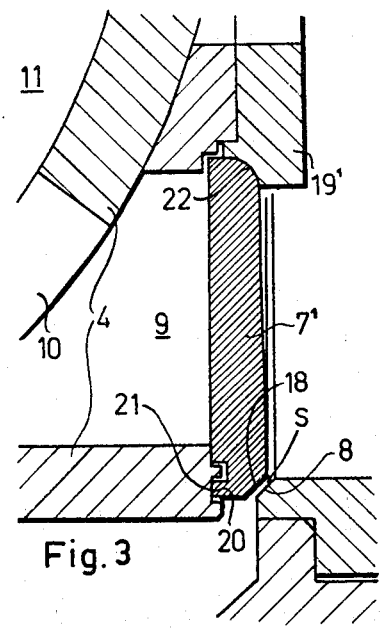
Figure 4:
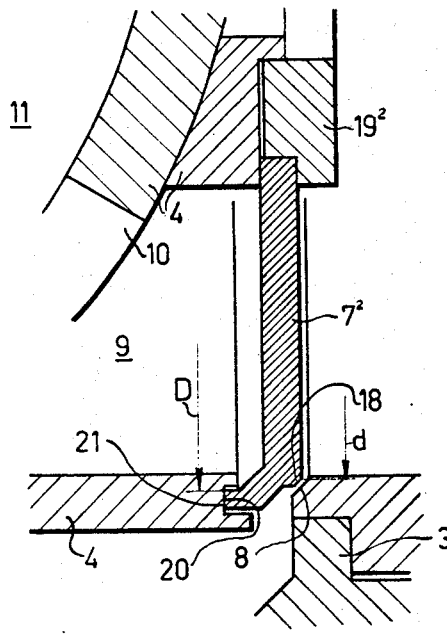

Examples of embodiment of the subject of the invention are illustrated in simplified form in the drawing wherein:

FIG. 1 is an axial longitudinal sectional view through the rotary valve with the parts of the pipeline immediately adjoining the valve; and FIGS. 2, 3 and 4 each show a fragment of FIG. 1 on a larger scale, with different constructions of the closure member.

According to FIG. 1, the rotary valve is arranged between two parts 1 and 2 of a pipeline. It comprises a housing 3 and a rotor 4 which is mounted rotatably with two journals 5 and 6 in the housing 3. The rotor 4 is illustrated in its closed position. The housing 3 has spaced openings forming an inlet and an outlet for the throughflowing fluid and the rotor 4 has a tubular member for alignment with said openings to provide unobstructed fluid flow through the valve in its open position.

Arranged at the valve rotor 4 is a closure member 7 which is constructed as an elastically yieldable annular plate and which co-operates with an annular valve seat 8 arranged in the valve housing 3 about its opening adjoining pipeline part 2. At the rearside, i.e., at the side which is remote from this valve seat 8, the closure member 7 bounds together with the valve rotor 4 an annular chamber 9 which communicates through apertures 10 with a duct 11 formed in the rotor 4. A central bore 12 of the journal 6 also communicates through a further duct 13 with the duct 11, and on the other hand can be connected at the journal end by way of a fixed conduit 14 and a three-way cock 15 by means of conduits 16, 17 selectively to the interior of one or the other of the pipeline parts 1 and 2. This apparatus enables the annular chamber 9 to be selectively subjected to pressure with pressure fluid taken from the inlet side of the valve or to be relieved of pressure by discharging the pressure fluid to the outlet side of the valve.

As the larger-scale illustration in FIG. 2 shows, the closure member 7 constructed as an elastically yieldable annular plate is provided at its front side at the outer edge with a sealing surface 18 which is adapted to come to bear against the valve seat 8 of the housing 3. At the inner edge, on the contrary, the closure member 7 is held fast between the valve rotor 4 and a ring 19 fixed thereto by screws not shown in the illustration, i.e., is rigidly secured to the rotor 4, the arrangement being such that in the closed position of the rotor 4 no pressure is exerted by the closure member 7 on the valve seat of the housing 3 when fluid pressure is the same on both sides of the said closure member. On the contrary, as FIG. 2 shows, a clearance s is left free between the sealing surface 18 and the seat 8.

The closure member 7 is provided at its rear side with a further annular sealing surface 20 which co-operates with a sealing seat 21 arranged on the valve rotor 4. When there is equal fluid pressure at both sides of the closure member 7, the latter bears with the aforesaid further sealing surface 20 against the sealing seat 21 of the rotor 4 in pressureless manner or with preload. The annular chamber 9 is then sealed completely relatively to its surroundings, i.e., to the space between rotor 4 and housing 3. Fluttering of the sealing ring 7 during operation can be prevented by the aforesaid preload.

The form of embodiment described is primarily intended for the case of downstream arrangement of the valve seat 8, and the fluid flowing in through the pipeline part 1 and out through the pipeline part 2, as indicated by the arrows A in FIG. 1. If in the closed position of the rotor the three-way cock 15 is brought into a position in which the annnular chamber 9 is subjected to the inlet pressure of the fluid in the pipeline part 1, the closure member 7 bends and its sealing surface 18 is pressed against the valve seat 8 of the housing. At the side of the sealing seat 21 of the roter 4 a small gap opens, so that the annular chamber 9 then communicates also through this gap and the space between the roter 4 and the housing 3 with the inlet side of the rotary valve. The closure member 7 is then held under positive pressure even when there is no longer a connection by way of the conduit 16.

When the valve is to be opened again, by changing-over the three-way cock 15 the annular chamber 9 is brought into communication through the conduit 17 with the outlet side of the rotary valve and thus a pressure equilibrium between the annular chamber 9 and the outlet side is brought about. The closure member 7 is relieved of load and resumes its original shape, and as shown in FIG. 2 the clearance s between the sealing surface 18 and the sealing seat 8 is re-established so that the rotor 4 can be rotated about its axis.

FIG. 3 shows a closure member 7¹ which is constructed as an elastically yieldable annular plate and which in contrast to the form of embodiment shown in FIG. 2 is not connected rigidly at the inner edge to the valve rotor 4 but abuts on an annular surface 22 of a ring 19¹ fixed to the rotor 4. The elastically yieldable annular plate forming the closure member 7¹ is thus annularly pivotally connected at its inner edge to the rotor 4. The bearing contact zone can be situated at such a distance from the axis of rotation of the rotor 4, that the closure member 7¹ is pressed with preload against the sealing seat 21 in the event of equal fluid pressures at both sides, the originally plane annular plate assuming the form of a shallow truncated cone.

When the annular chamber 9, as described in connection with FIG. 2 is charged with fluid under pressure, the radical cross-sections of the closure member 7¹ turn about the bearing contact zone at the inner edge with elastic deformation of the annular plate, until the sealing surface 18 is pressed against the valve seat 8 of the housing.

The closure member 7¹ is made thicker than the closure member 7. But since the closure member 7¹ is not rigidly fixed at the inner edge it is possible for it to be deformed with the same positive pressure in the chamber 9 until bearing contact against the seat 8 is achieved.

At the bearing contact surface 22, the pivotally fixed closure member 7¹ is displaced relatively to the rigidly fixed ring 19¹ when its outer edge moves from the position shown in FIG. 3 to abutment against the valve seat 8. But this relative displacement is very slight in comparison with the movement of the outer edge of the closure member 7¹ and can be optionally reduced by reducing the clearance s, so that wear is avoided.

The form of embodiment according to FIG. 4 is primarily intended for upstream arrangement of the valve seat 8. The fluid in this case flows, as the arrows B indicate, in through the pipeline part 2 and out through the pipeline part 1. The valve seat 8 in the housing 3 is arranged in this case at the inlet side of the valve. A closure member 7² constructed as an elastically yieldable annular plate is held fast in sealing-tight manner at its inner edge by means of a ring 19² fixed by screws (not shown) to the rotatable valve member 4. The annular seat 8 has a diameter d. The fluid pressure prevailing in the pipeline part 2 acts on the front side surface of the closure member 7² which faces toward the pipeline part 2 and is situated within the seat 8. The rear side surface of the closure member 7² which bounds the annular chamber 9 and is subjected to the fluid pressure prevailing therein has an external diameter D which is greater than the diameter d of the sealing seat 8. When there is the same fluid pressure in the annular chamber 9 and in the pipeline part 2 and the housing 3 is relieved of pressure, therefore, the closure member 7² is elastically deformed and pressed with its sealing surface 18 against the seat 8 of the housing 3.

By establishing communication between the interior of the pipeline part 2 situated at the inlet side in this constructional form and the annular chamber 9 by means of the three-way cock 15, therefore, a reliable closing of the pipeline at the inlet side of the valve can be achieved.

The rotary valve which has been described is preferably intended for use as a closure means in pipelines used for hydraulic power plants. The constructional form of the closure member shown in FIG. 4 permits of inlet side closing of the pipeline without the pressure water supplied to the annular chamber 9 having to have a higher pressure than the pressure prevailing in the inlet pipe. The closure member 7² can be used for example as an inspection shut-off means, the valve housing being relieved of water pressure and the outlet side of the valve made freely accessible.

What is claimed is:

1. A rotary valve comprising a housing having spaced openings forming an inlet and an outlet for through-flowing fluid; means forming an annular valve seat about at least one of said openings; a rotor mounted in said housing so as to be rotatable between an open position and a closed position; said rotor having a tubular member for alignment with said openings to provide unobstructed fluid flow through the valve in its open position and a closure member consisting of an elastically yieldable annular plate connected at its inner edge to the rotor and provided at its front side with an annular sealing surface radially spaced from said inner edge and adapted to cooperate, in the closed position of the rotor, with said valve seat to close said opening, and said rotor being formed to define with the rear side of said elastically yieldable plate an annular chamber; and means for selectively subjecting said annular chamber to fluid pressure so as to press said elastically yieldable annular plate against said valve seat or to relieve it of pressure.

2. The rotary valve defined in claim 1, in which in the closed position of the rotor the elastically yieldable annular plate, when not subjected to fluid pressure, leaves free a clearance between its annular sealing surface and the annular valve seat.

3. The rotary valve defined in claim 1 in which the elastically yieldable annular plate is provided on its rear side in the region of its outer edge with a further annular sealing surface and the rotor is provided with an annular sealing seat arranged to cooperate with said further sealing surface so as to seal said annular chamber from the surroundings of the rotor.

4. The rotary valve defined in claim 3 in which the elastically yieldable annular plate, when not subjected to fluid pressure, bears with said further annular sealing surface against said sealing seat of the rotor.

5. The rotary valve defined in claim 1 in which the elastically yieldable annular plate is rigidly connected at its inner edge to the rotor.

6. The rotary valve defined in claim 1 in which the elastically yieldable annular plate is annularly pivotally connected at its inner edge to the rotor.

7. A rotary valve comprising a housing having spaced openings forming an inlet and an outlet for through-flowing fluid; means forming an annular valve seat about said outlet opening; a rotor mounted in said housing so as to be rotatable between an open position and a closed position; said rotor having a tubular member for alignment with said openings to provide unobstructed fluid flow through the valve in its open position and a closure member consisting of an elastically yieldable annular plate connected at its inner edge to the rotor and provided at its front side in the region of its outer edge with an annular sealing surface adapted to cooperate, in the closed position of the rotor, with said valve seat to close said outlet opening; said rotor being formed to define with the rear side of said elastically yieldable annular plate an annular chamber, and the rotor and the rear side of said annular plate having cooperating annular sealing surfaces to seal said annular chamber from the surroundings of the rotor; said sealing surface of the rotor and the valve seat of the housing being arranged in such a manner that in the closed position of the rotor, the anular plate is allowed to elastically yield in a limited range; and means for selectively subjecting said annular chamber to fluid pressure so as to press said elastically yieldable plate against said valve seat or to relieve it of pressure.

8. A rotary valve comprising a housing having spaced openings forming an inlet and an outlet for through-flowing fluid; means forming an annular valve seat about said inlet opening, a rotor mounted in said housing so as to be rotatable between an open position and a closed position; said rotor having a tubular member for alignment with said openings to provide unobstructed fluid flow through the valve in its open position and a closure member consisting of an elastically yieldable annular plate connected at its inner edge to the rotor and provided at its front side, intermediate the inner and outer edge, with an annular sealing surface adapted to cooperate, in the closed position of the rotor, with said valve seat to close said inlet opening; said rotor being formed to define with the rear side of said elastically yieldable annular plate an annular chamber, and the rotor and the rear side of said annular plate having cooperating annular sealing surfaces situated radially outward of the front side sealing surface of the annular plate to seal said annular chamber from the surroundings of the rotor; said sealing surface of the rotor and the valve seat of the housing being arranged in such a manner that, in the closed position of the rotor, the annular plate is allowed to elastically yield in a limited range; and means for selectively subjecting said annular chamber to fluid pressure so as to press said elastically yieldable plate against said valve seat or to relieve it of pressure.

9. The rotary valve defined in claim 8 in which the means for subjecting said annular chamber to fluid pressure are designed to allow the chamber to be subjected to the fluid pressure prevailing upstream of the valve.

References Cited
UNITED STATES PATENTS

| | | | |
|---|---|---|---|
| 3,006,600 | 10/1961 | Fawkes | 251—175 |
| 3,020,019 | 2/1962 | Fawkes | 251—175 |
| 3,008,685 | 11/1961 | Rudden | 251—160 |
| 3,069,129 | 12/1962 | Grove | 251—328 |
| 3,100,104 | 8/1963 | Moore | 251—306 |

FOREIGN PATENTS

| | | |
|---|---|---|
| 444,841 | 3/1936 | Great Britain. |
| 651,114 | 3/1951 | Great Britain. |
| 653,141 | 10/1928 | France. |
| 713,532 | 10/1931 | France. |

CLARENCE R. GORDON, *Primary Examiner.*